A. GIANNOUSIS.
MEASURING INSTRUMENT.
APPLICATION FILED DEC. 24, 1908.
927,523.
Patented July 13, 1909.
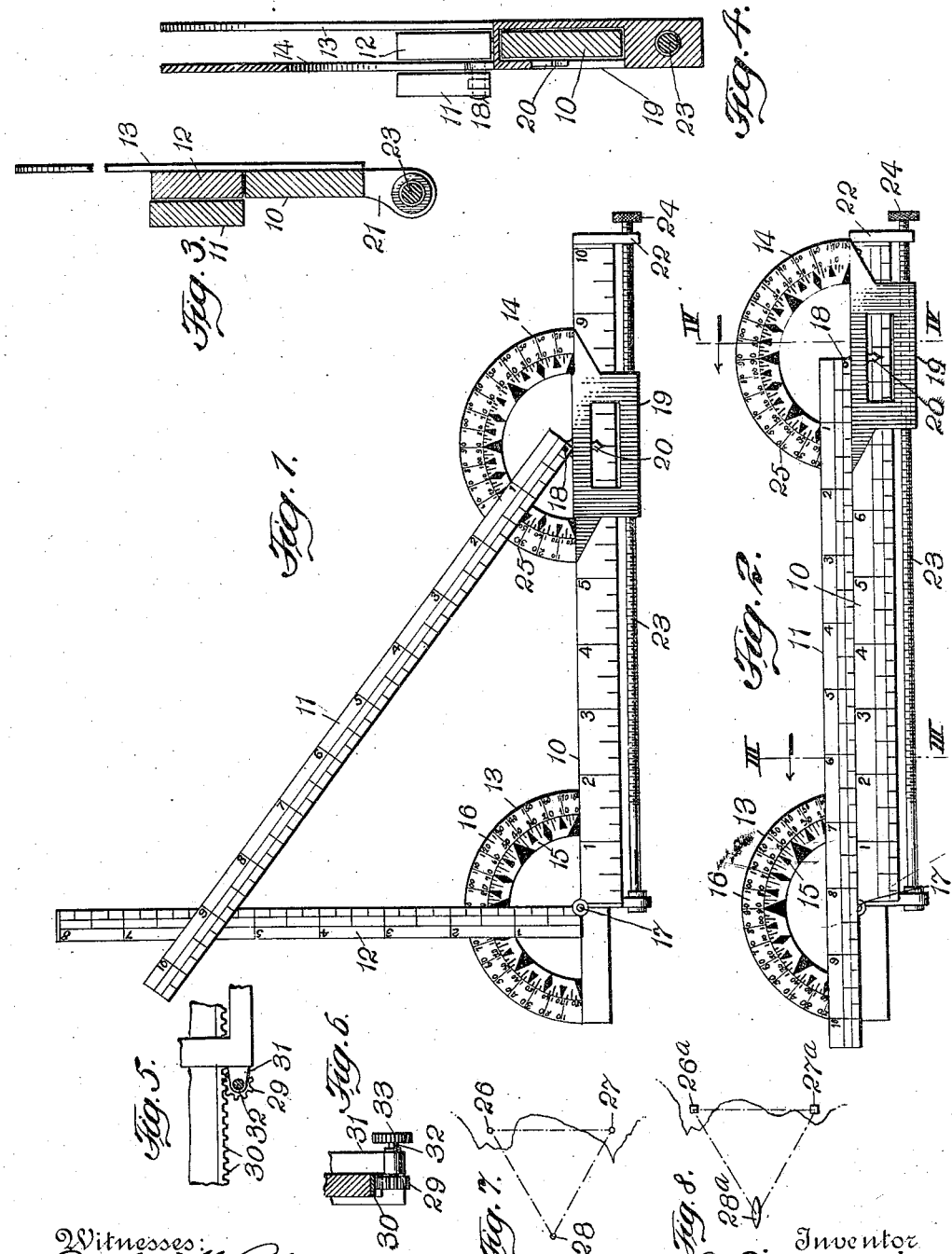

UNITED STATES PATENT OFFICE.

ATHANASIUS GIANNOUSIS, OF NEW YORK, N. Y.

MEASURING INSTRUMENT.

No. 927,523.  Specification of Letters Patent.  Patented July 13, 1909.

Application filed December 24, 1908. Serial No. 469,169.

*To all whom it may concern:*

Be it known that I, ATHANASIUS GIANNOUSIS, a subject of the King of Greece, and a resident of New York, county and State of New York, have invented certain new and useful Improvements in Measuring Instruments, of which the following is a full, clear, and exact description.

This invention relates more particularly to a trigonometrical instrument to be used in connection with navigating, piloting and for other purposes.

The primary object of the invention is to provide a simple and efficient device which may be used in connection with navigating to determine the course, the difference of latitude, and distance with relation to a vessel when certain features are known, and to provide an instrument which may be also employed when piloting a vessel, and which is so constructed that the parts thereof may be readily and quickly adjusted so that the result sought may be accurately and quickly ascertained, thus overcoming many of the objections incident to the ordinary methods employed for such purposes.

Another object of the invention is to provide a simple and efficient instrument which may be used to determine from the land the position of an object on the water, as a vessel, when the distance between two points on land is known.

A further object of the invention is to provide a simple instrument which may be employed for solving various trigonometrical problems instead of using the table of logarithms.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of instrument embodying my invention showing the parts thereof in use and in one of their open positions. Fig. 2 is a detail elevation of the parts when not in use. Fig. 3 is a sectional view taken on the line III—III of Fig. 2. Fig. 4 is a sectional view taken on a line IV—IV of Fig. 2. Figs. 5 and 6 show a different means that may be employed for adjusting one of the parts; and Figs. 7 and 8 are diagrammatic views showing how the position of an object may be determined by means of the instrument.

The instrument may have its parts variously constructed and variously arranged with relation to each other to adapt it for the various purposes for which it may be used and may be made of any suitable material. As shown it comprises a normally fixed bar, leg or member 10 and two movable bars, legs or members 11 and 12, and on the fixed member 10 are located two protractors 13 and 14, the former being normally fixed to the member 10, and the latter being movable along said member 10.

For the purpose of understanding one form of the invention I have indicated a scale on each of the members, and each of the characters may indicate a fraction of a mile or a multiple of miles according to the purpose for which it is used, or other measurements or characters may be placed thereon, and when said instrument is used for navigating purposes, the member 10 may be employed to indicate the difference of latitude, the member 11 the distance, and the member 12 the departure. Each of the protractors 13 and 14 is provided on the inner side, as at 15, with compass characters, and on the outer side, as at 16, with a scale indicating the various degrees, and these degrees may be one hundred to each right angle or may have the usual division of ninety degrees as shown.

The member 12 is always placed at right angles to the member 10, and at ninety degrees for navigating purposes, and for piloting may be used at any degree, and said member 12 may be pivoted centrally of the protractor 13, at 17, so as to permit said member to be moved about the protractor 13, and also to be folded in close relation to the member 10 when not in use. The member 11 is pivoted at 18 to a slide 19 to which is held the protractor member 14, and carried by the slide 19 is a pointer 20 which is adapted to indicate the distance the center of the protractor is from a given point on the member 10.

To move the protractor and member 11, any suitable means may be employed. As shown the ends of the member 10 are provided with brackets 21 and 22, and rotatably held in said brackets is a threaded rod 23 which engages a threaded aperture in the slide 19, and on the end of said threaded rod 23 is a head or fingering part 24 by which the said slide 19, member 11, and protractor 14 may be adjusted to different distances from the center of the protractor 13.

The instrument as thus constructed may be employed to solve various problems. For example, in navigating, if we turn the member 11 to the given course, the said course being always indicated by the movement of the member 11 about the protractor 14 from or toward the member 10, as at 25, and the member 12 placed at right angles to the member 10 and then move the protractor 14 along the member 10 until the member 11 reaches the given number of the course on the inside edge of the member 12, the departure will be given on the member 12, and the difference of latitude on the member 10. If the difference of latitude and departure are given, the course and distance may be obtained by moving the protractor 14 until the pointer registers with the given number of miles on the member 10, after which we turn the member 11 until it reaches the given number of miles on the member 12. This will give the course on the protractor 14 between the inner edge of the member 11 and the opposed edge of the member 10, while the member 11 will give the distance from the starting to the point where it intersects the member 12. If the course and difference of latitude are given, the protractor member 14 is moved until the pointer indicates the difference of latitude on the member 10, and the member 11 is then moved until the angle is equal to the given course, the result being that the member 12 will give the departure and the member 11 the distance; while if the course and departure are given, the member 11 is moved until the angle between said member and the member 10, as at 25, is equal to the given course, after which the protractor or member 14 is moved along the member 10 until the member 11 crosses or intersects the member 12 equal to the given number of miles and departure, which will give the distance along the member 11 and the difference of latitude will be given along the member 10. In like manner the course and departure may be determined if the distance and difference of latitude are given; or if the distance and departure are given the course of difference of latitude may be quickly and accurately ascertained. While the several problems given are for ordinary sailing, the instrument is equally adapted for use in connection with other kinds of sailing.

If in piloting, two bearings of a known object are given, and we assume the member 10 as the distance run between the two bearings, and the members 11 and 12 as the bearings, the point where the members 11 and 12 intersect or cross each other will be the distance from the first and second bearings. If as shown in Fig. 7, two known objects, as 26 and 27 are certain distances apart, and we use the compass to take the bearings, the instrument can then be set to make the angles 28, 26 and 27 equal to the angle formed by the members 10 and 11 of the instrument, and the angles 28, 27 and 26, be made to equal the angle formed by the members 10 and 12, the member 11 will then give the distance between the points 26 and 28, and the member 12 will give the distance between 28 and 27.

If we assume, Fig. 8, that $27^a$ and $26^a$ indicate two forts along the coast, and $28^a$ a vessel, at a distance therefrom, and it is desired to determine how far the vessel is away from the forts, this may be ascertained by the instrument. The fort $26^a$ takes the angles $28^a$, $26^a$, $27^a$, and communicates the same to fort $27^a$, and the latter fort gives the angle to fort $26^a$. This being done each fort sets its instrument to form the respective angles so that the angle formed by the members 10 and 11 of the instrument corresponds to the angle $28^a$, $26^a$, $27^a$, of fort 26, and the angle formed by the members 10 and 12 corresponds to the angle $26^a$, $27^a$, $28^a$, of the instrument. The member 11 will then give the distance from the fort $26^a$, and the member 12 will give the distance of the vessel from the fort $27^a$. The instrument is also adapted for solving problems in trigonometry without using the table of logarithms.

In Fig. 5, the protractor 14, instead of being moved along the member 10 by the screw or threaded rod 23, may carry a pinion 29, and this pinion may engage the teeth 30 of a rack 31 secured to one edge of the member 10, and on the shaft or spindle 32 of the pinion 29 may be arranged a fingering portion 33 whereby the pinion may be rotated to adjust the protractor member 14 along said member 10.

From the foregoing it will be seen that a simple and efficient instrument may be provided which may be used for various purposes to ascertain at a glance certain measurements; that said instrument may be used for coast defense or to solve various problems for which an instrument of this character is adapted; that said instrument may be readily constructed and the parts so made that the members may be quickly adjusted with relation to each other.

Having thus described my invention, I claim as new and desire to secure by Letters Patent:—

1. An instrument of the character described, comprising a normally stationary supporting bar, a stationary protractor carried by one end of said bar, a protractor bar pivotally connected to said stationary bar in operative relation with said protractor, a slide mounted on said stationary bar, a protractor carried by said slide, a second protractor bar pivotally connected with said slide in operative relation with the second protractor, and means for adjusting said slide.

2. An instrument of the character described comprising a normally stationary supporting bar, a stationary protractor secured to one end of said bar adjacent one edge thereof, a protractor bar pivotally connected to said stationary bar in operative relation with said protractor, a slide mounted on said stationary bar, a protractor secured to one edge of said slide, whereby a space is formed between said protractors to accommodate said protractor bar when in folded position, a second protractor bar pivotally connected with said slide in operative relation with the second protractor, and means for adjusting said slide.

3. An instrument of the character described comprising a normally stationary supporting bar, a stationary protractor carried by one end of said bar, a protractor bar pivotally connected to said stationary bar in operative relation with said protractor, a slide mounted on said stationary bar, a protractor carried by said slide, a pivot pin projecting laterally from said slide, a second protractor bar mounted on said pin and in operative relation with the second protractor, means for adjusting said slide, and a pointer carried by said slide and in juxtaposition with said pivot pin.

4. An instrument of the character described, comprising a normally stationary supporting bar, a stationary protractor secured to one end of said bar adjacent one edge thereof, a protractor bar pivotally connected to said stationary bar in operative relation with said protractor, a slide mounted on said stationary bar, a protractor secured to one edge of said slide, whereby a space is formed between said protractors to accommodate said protractor bar when in folded position, a pivot pin projecting laterally from said slide, a second protractor bar mounted on said pin and in operative relation with the second protractor, means for adjusting said slide, and a pointer carried by said slide, and in juxtaposition with said pivot pin.

This specification signed and witnessed this 12th day of December A. D. 1908.

ATHANASIUS GIANNOUSIS.

Witnesses:
  W. A. TAWNER, Jr.,
  M. COOKE.